June 16, 1942.   R. T. HURLEY   2,286,621
PRESSURE MEASURING APPARATUS
Filed Dec. 23, 1938   2 Sheets-Sheet 1
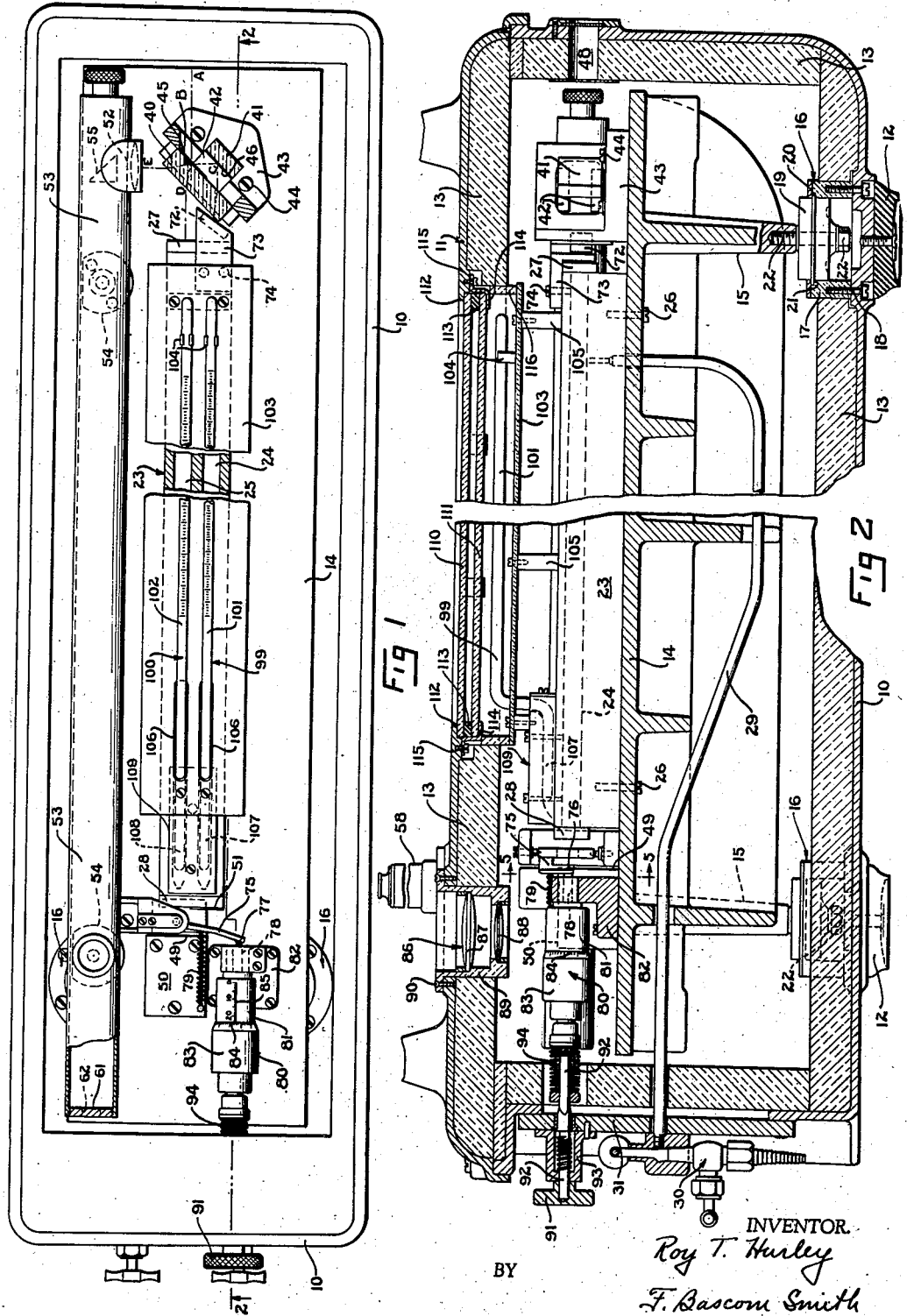
INVENTOR.
Roy T. Hurley
BY
F. Bascom Smith
ATTORNEY.

June 16, 1942.　　　　R. T. HURLEY　　　　2,286,621
PRESSURE MEASURING APPARATUS
Filed Dec. 23, 1938　　　2 Sheets-Sheet 2
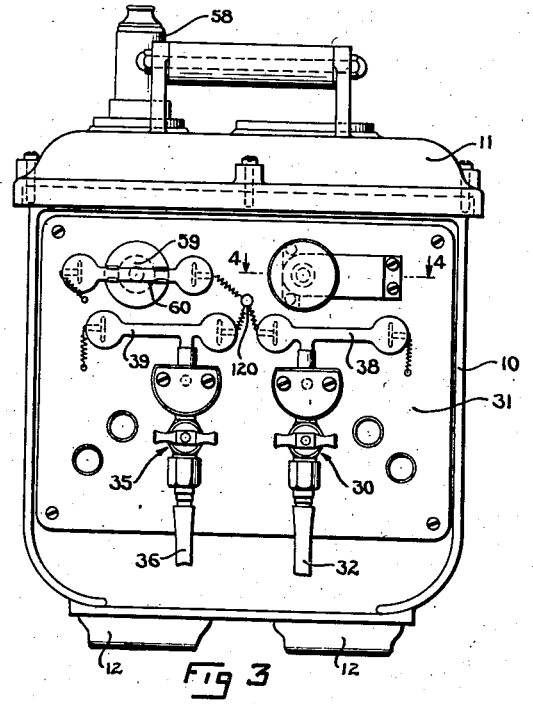
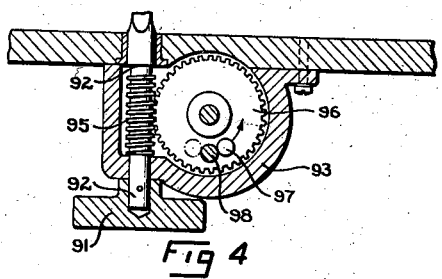
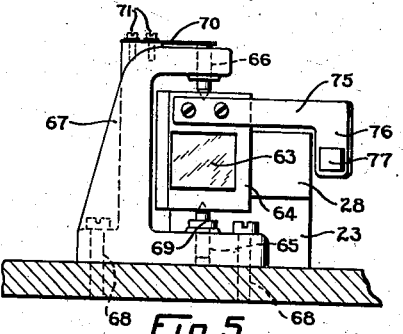
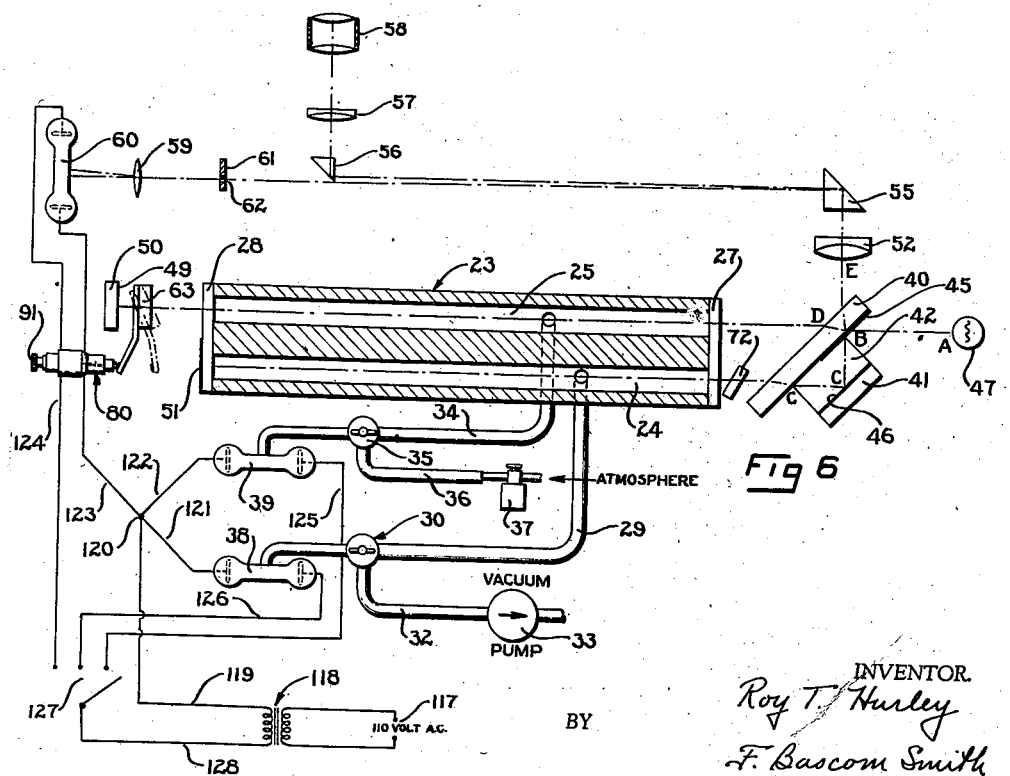
INVENTOR.
Roy T. Hurley
F. Bascom Smith
ATTORNEY.

Patented June 16, 1942

2,286,621

UNITED STATES PATENT OFFICE 2,286,621

PRESSURE MEASURING APPARATUS

Roy T. Hurley, Dobbs Ferry, N. Y., assignor to Bendix Aviation Corporation, South Bend, Ind., a corporation of Delaware Application December 23, 1938, Serial No. 247,379

15 Claims. (Cl. 88—14)

This invention relates to measuring devices and more particularly to a pressure measuring device utilizing the light interference principle for effecting accurate determinations of barometric pressures and altitudes.

An object of the present invention is to provide a novel measuring device employing interference fringes to determine the difference between the pressure of a given medium and that of a fixed standard such as a vacuum.

Another object of the invention is to provide a compact measuring apparatus having novel means embodied therewith for readily checking and reproducing the standard against which measurements are made and for calibrating the indicating mechanism.

A further object is to provide a novel device operable as an altimeter to give an altitude reading relative to a standard predetermined altitude.

A still further object of the invention is to provide a novel apparatus for dividing and recombining a light beam wherein the divided rays of the beam travel over paths having optical lengths which remain substantially unaffected by ordinary changes in temperature.

Still another object is to provide a novel pressure and altitude measuring device adaptable for use as a field instrument to give accurate readings under conditions of varying temperatures.

The above and other objects and novel features of this invention will more fully appear from the following detailed description when the same is read in connection with the accompanying drawings. It is to be expressly understood, however, that the drawings are for purposes of illustration only and are not intended as a definition of the limits of the invention, reference being primarily had for this latter purpose to the appended claims.

In the drawings, wherein like reference characters refer to like parts throughout the several views:

Fig. 1 is a top plan view, with parts broken away, of one embodiment of the present invention with a cover therefor removed;

Fig. 2 is a sectional view, with parts broken away, taken substantially along line 2—2 of Fig. 1;

Fig. 3 is an end elevation of the above embodiment;

Fig. 4 is a somewhat enlarged sectional view taken substantially along line 4—4 of Fig. 3 showing a form of control mechanism utilized in the present invention;

Fig. 5 is a somewhat enlarged sectional view taken substantially along line 5—5 of Fig. 2 showing a mechanism adapted to vary the optical length of an interference beam; and, Fig. 6 is a diagrammatic view showing types of electrical and optical systems utilized in the invention.

It is well known that if a beam of white light is divided into two rays, each of which is directed over a path of the same optical length, i. e. a length which is a direct function of the index of refraction of the medium of travel as well as of the geometric length thereof, and the rays are thereafter combined into a single beam, interference fringes are produced which have a single black fringe centrally located relative to the other colored fringes. If the optical length of one of the paths is thereafter varied, for example by a variation in the index of one of the mediums of that path, the black fringe appears displaced from its central position. To compensate for this variation and bring the black fringe back to its central position, the geometric length of one of the mediums of the changed path may be varied. A measure of this change in geometric length is a measure of the index variation producing the original change in the optical length. Thus, if a pressure change caused the variation in index for which compensation is made, this pressure change may be measured by measuring a linear distance, namely the increase or decrease in geometric length of the compensating medium.

Accordingly, in the present invention novel means are provided for dividing a beam of light into two rays and for causing one of said rays to travel a path comprised in part of a medium of predetermined optical length such as a vacuum and causing the other ray to travel a path comprised in part of a medium such as atmospheric air whose pressure is to be measured, said last-named path having an unknown optical length but a known geometric length. Means are provided in the path containing the medium of unknown pressure whereby compensation for the difference in optical lengths of the two paths due to the difference in pressure of their mediums may be effected. The length of compensating medium which must be introduced to equalize the optical paths is a measure of the pressure difference between the above mediums. This difference will be indicated as an absolute pressure of the unknown medium when the standard medium against which comparison is made is a vacuum.

In the single embodiment of the present invention illustrated, by way of example, a portion of the mechanism is housed in a casing 10 provided with a cover 11 secured to the top thereof and with supports 12 of yielding material fixed to the base thereof. To maintain a uniform temperature within said casing under all external conditions, the latter, together with cover 11, is provided with a lining 13 of suitable insulating material such as the rubber compound commercially known as Vacoboard, said lining being preferably cemented to the interior of the walls of said casing and said cover.

A suitable massive base or frame 14 supported at three points by legs 15 is mounted within casing 10, said legs being secured to said casing by means of suitable vibration eliminating members 16. Each of the latter comprises an annular socket 17 (Fig. 2) preferably formed from a heat insulating material such as Bakelite and secured to said casing by screws 18. A disc or plate 19 of yielding material, such as rubber, is supported within said socket by an annular flange 20 which is fixed to said disc and is mounted in a groove 21 in the wall of said socket. Bolts 22 extending through said discs are threadedly secured to legs 15. Vibrations and sudden shocks imparted to casing 10 are thus absorbed by the above structure and frame 14 is unaffected thereby.

In order to provide optical paths having equal geometric lengths for the mediums of unknown and known pressures, a bar 23 of accurately known length having parallel openings 24 and 25 extending the length thereof is mounted upon frame 14, being secured thereto by screws 26. A pair of transparent glass plates 27 and 28 are wrung or cemented to the ends of bar 23 creating chambers of equal geometric length within said bar which are isolated from the interior of casing 10. Plates 27 and 28 have parallel surfaces so that equal thicknesses of glass form the ends of chambers 24 and 25.

A conduit 29 (Figs. 2 and 6) preferably flexible and having a low coefficient of thermal conductivity connects chamber 24 with a manually operable valve 30, the latter being mounted on a panel 31 secured to the front end of casing 10. A conduit 32 connects said valve, which is normally closed, to a suitable means such as a vacuum pump 33 (Fig. 6) for evacuating chamber 24. A conduit 34 (Fig. 6) similar to conduit 29 connects chamber 25 to a valve 35 (Fig. 3) mounted on panel 31 and said valve, which is normally open, is connected by a second conduit 36 (Fig. 6) to a point at which a pressure measurement is to be made. To dry the small quantities of air flowing into said last-named chamber with pressure increases, an absorption chamber or bulb 37 (Fig. 6) is interposed in conduit 36.

A pair of Geissler tubes 38 and 39 (Fig 3) communicating directly with conduits 29 and 34, respectively, are supported by valves 30 and 35 and when a high potential is applied across the terminals of one of said tubes the luminous discharge produced therein is an accurate measure of the degree of vacuum existing in the chamber to which said tube is connected.

Means are provided for dividing a beam of light into two rays of substantially equal intensities and for directing said rays into chambers 24 and 25, said means comprising a pair of transparent plates 40 and 41 (Figs. 1 and 6) preferably of quartz having accurately planed parallel surfaces and fixed in parallel relation to each other at a predetermined distance from each other by a pair of parallel surfaced quartz separating plates 42 interposed between and wrung to said plates. The unit comprising said plates and said separators is mounted upon a bracket 43 secured by screws 44 to supporting frame 14.

A portion 45 of the surface of plate 40 adjacent plate 41 is coated with a thin film of metal adapted to divide the light striking it into two parts, one part being transmitted through and the other part being reflected from said film. Surface 46 of plate 41 is completely coated with a film of metal which reflects substantially all the light falling thereon. Thus, a beam of light AB emanating from a suitable source such as an incandescent bulb 47 (Fig. 6) passing into casing 10 through a window 48 (Fig. 2) in the wall of said casing, strikes film 45 at an angle of approximately 45° and is divided into two rays BC and BD.

Ray BC, which is reflected from said film, strikes surface 46 and is totally reflected through the unsilvered part of plate 40 and plate 27 into chamber 24. Ray BD passes through plate 40 and plate 27 into chamber 25, traversing the length of said chamber and passing therefrom to a polished surface 49 of a metal block 50 which is secured to frame 14 and from which said ray is reflected back along its path to the plane of separation designated by point B. Ray BC is similarly caused to retrace its path back to the plane of separation after traversing the length of chamber 24, being reflected by a film 51 of metal on the exterior surface of the portion of plate 28 which covers said last-named chamber. The distance traveled by ray BD after passing through plate 28 is substantially equal to the additional distance traveled by ray BC (distance BC in Fig. 1) between plates 40 and 41, so that the rays pass over paths of equal geometric length and, except for the mediums within chambers 24 and 25, through substantially equal lengths of like mediums.

The rays are reunited at B and by means of their interference or reenforcement produce the fringes whereby the optical lengths of the paths of said rays may be compared. Beam BE, formed by the reunited rays, passes upward (as viewed in Figs. 1 and 6) through plate 40 and preferably through an achromatic lens 52 into a hollow tube or cylinder 53 suitably mounted on brackets 54 secured to frame 14. A prism 55 mounted within said tube in the path of beam BE reflects the latter along the length of said tube to a second prism 56 (Fig. 6) mounted therein, and said last-named prism reflects the beam in turn through an achromatic lens 57 to a telescope eyepiece 58 through which an observer may view the interference fringes.

Telescope 58 is normally focused on polished surface 49 of block 50 and surface 51 of plate 28, and a line is engraved or a cross hair is stretched across one of said surfaces in such a manner that when it is viewed through said telescope it is parallel to the fringes and thus provides a reference line by which the black fringe may be centered. Due to this arrangement, accidental movement of telescope 58 does not vitiate the relative positions of the fringes and the reference line.

It is desirable at times, for instance when calibrating the indicating scales, to have the interference fringes produced by the reenforcement of monochromatic light of a known wave length such as the light emanating from the luminous discharge of helium gas. For this purpose, a condenser lens 59 (Figs. 3 and 6) adapted to gather and concentrate rays of light into a beam is mounted in panel 31 being suitably located relative to tube 53 to have its axis a short distance beneath the axis of said tube. A Geissler tube 60 filled with a suitable gas, such as helium, is mounted on said panel and has the central cylindrical portion thereof extending across said lens and when a high potential is applied across the terminals of said tube a luminous discharge of monochromatic light is produced.

A beam of this light passes through lens 59 to enter casing 10 and passes into tube 53 through a mask 61 (Figs. 1 and 6) secured to the end of said tube, said mask having a slot 62 therein which directs said beam beneath prism 56 and onto prism 55. From prism 55 the beam is reflected (Fig. 6) substantially along path EB to the plane of separation, i. e. the partly coated portion 45 of plate 40, where said beam is divided and the rays thereof directed through chambers 24 and 25. Because of the slight angle at which said beam is directed through tube 53, part of the recombined beam is reflected from prism 55 to prism 56 instead of back to mask 61. Thus the fringes which are of one color and uniformly spaced as distinguished from the vari-colored white light fringes may be viewed through eyepiece 58.

Novel means are provided to vary the optical length of one of the paths of the divided rays BC and BD and thereby cause said paths to be of equal optical lengths despite the difference in the pressures of the mediums in chambers 24 and 25. In the illustrated embodiment, said means are applied to path BD and as shown comprise a transparent plate 63 (Fig. 6) of fluorite interposed in said path between plate 28 and polished surface 49 of block 50. A frame 64 (Fig. 5) carries plate 63, the latter being preferably cemented therein and said frame is pivotally mounted between conical pivots 65 and 66. The latter are freely mounted in openings provided therefor in a bracket or support 67 which is secured to frame 14 by screws 68, lower pivot 65 being held in engagement by a collar 69 integral therewith which engages the surface of said bracket and upper pivot 66 being urged into engagement with frame 64 by a cantilever spring 70. The latter is fixed at one end to said bracket by means such as screws 71, and has the free end thereof engaging and applying a pressure to the upper end of pivot 66 which extends through said bracket a short distance beyond the surface thereof. When frame 64 is pivoted, the length of fluorite in the path of ray BD is varied, varying the optical length of that path.

To cause the change in optical length of path BD to be due to a difference in the lengths of fluorite in the two paths, a plate of fluorite 72 (Figs. 1 and 6) is provided in path BC between plate 40 and plate 27, said fluorite plate being carried by a bracket 73 attached to bar 23 by means of screws 74. By interposing fluorite in both paths it remains possible to have said paths of equal optical length when the mediums in the chambers are alike and, furthermore, the presence of fluorite in both paths of the optical system produces interference fringes which are very distinct and clear.

In order to control the pivotal movements of frame 64 and simultaneously measure the amount of medium thereby introduced in the optical path, novel means operable from the exterior of casing 10 are provided. An arm 75 (Figs. 1 and 5) secured to the face of frame 64 extends radially from the axis of rotation of said frame and has a downwardly extending portion 76 which carries a button or contact 77 formed from a hard surfaced material such as Carboloy. Arm 75 is adapted to be actuated by a rod or drum 78 which is provided with a tip formed of the same material as contact 77 and these hard surfaced contacts provide the engaging surfaces whereby motion is transmitted to said arm by said rod. An expanded coil spring 79 fixed at one end to arm 75 and at the other end to block 50 maintains the engagement between said contact and said rod.

Rod 78 (Figs. 1 and 2) is the reciprocating element of an accurate micrometer mechanism 80 comprising a stationary drum 81 rigidly secured to supporting frame 14 by a bracket 82 and a rotary barrel 83 into which said drum telescopes and which motivates rod 78. A scale 84 is calibrated on the leading edge of barrel 83 and cooperates with a scale 85 axially calibrated on the surface of drum 81 to give an extremely accurate reading of the amount of motion imparted to rod 78 and consequently of the amount of fluorite introduced into optical path BD.

In order that scales 84 and 85 may be accurately read, a magnifying lens system 86 (Fig. 2), through which said scales are viewed, is provided in cover 11 and comprises lenses 87 and 88 carried by a tubular member 89 composed of a heat insulating material such as Bakelite, said member being fixed to said cover by screws 90.

For the purpose of actuating micrometer 80 from the exterior of casing 10, a readily accessible knob 91 is mounted upon a shaft 92 which extends through a housing 93 secured to panel 31 into the interior of said casing. To protect micrometer 80 from the transmission thereto of shocks and vibrations which are applied to knob 91 and to insure against misalignment of said micrometer, shaft 92 is connected to barrel 83 by a collapsible member, such as a Sylphon 94, adapted to transmit a torque but not an axial load, one end of said Sylphon being fixed to said shaft and the other end being secured to said barrel.

Novel means are provided for limiting the rotary motion of shaft 92, thereby preventing an overstressing of micrometer mechanism 80 by an inadvertent attempt to move the same beyond the allowable limits of motion therefor, said means comprising a worm 95 (Fig. 4) formed with shaft 92 and a gear 96 mounted within housing 93 and operatively engaging said worm. A pin 97 is fixed to or formed integrally with gear 96 on the face thereof, being movable therewith in a circular path, and a stationary pin or lug 98 secured to housing 93 extends downwardly therefrom into the path of motion of said first-named pin, thus limiting the rotation of said gear in either direction to slightly less than one revolution. The translatory motion of rod 78 of micrometer mechanism 80 is correspondingly limited.

To determine the temperature within casing 10, a pair of thermometers 99 and 100 (Figs. 1 and 2) are provided and calibrated stems 101 and 102 thereof are secured to a strip 103 of insulating material, such as Bakelite, by clamps or brackets 104, said strip being supported upon bar 23 by being screwed to lugs 105 interposed between said bar and said strip. Stems 101 and 102 curve downwardly at right angles to the plane of strip 103 and pass through openings 106 provided in said strip. These downwardly extending portions of said stems join bulbs 107 and 108 which are parallel to the plane of said strip, said bulbs being encased in a block 109 secured to bar 23. An accurate temperature reading may thus be obtained from said thermometers since the latter are calibrated over successive temperature ranges; for example, the scale of thermometer 99 reads from 0° to 25° C. and that of thermometer 100 from 20° to 35° C., thus providing an over-all range of from 0° to 35° C.

A pair of transparent glass plates 110 and 111 (Fig. 2) are mounted in the walls of an opening 112 in cover 11 directly above thermometer stems 101 and 102 so that the readings of the latter may be viewed and recorded from the exterior of the casing. Plates 110 and 111 are separated by spacing elements 113 and are supported by brackets 114 which are secured to cover 11 by screws 115. A strip 116 of yielding insulating material, such as rubber, is interposed along the edge of opening 112 between plate 111 and strip 103, preventing the conduction of heat into the interior of casing 10 through metal brackets 114.

An electrical circuit suitable for applying a high potential across the terminals of Geissler tubes 38, 39 and 60 is shown in Fig. 6 and comprises a source of electrical energy 117 connected across the low potential side of a transformer 118. A lead 119 from the high potential side of said transformer is connected to a common terminal 120 of conductors 121, 122 and 123, each of said conductors being connected to a terminal of one of said Geissler tubes. The other terminals of the latter are connected by conductors 124, 125 and 126 to separate contacts of a three-way single pole switch 127. The pole of said switch is connected by lead 128 to the other terminal of the high potential side of transformer 118. Thus, a high potential may be applied across any of said Geissler tubes.

Prior to use, the instrument is readily calibrated by exhausting chamber 25 to a vacuum equal to that in the standard chamber 24, said vacuums being accurately checked by applying high potentials across the terminals of Geissler tubes 38 and 39 and observing the luminous discharge produced within said tubes. Air is thereafter slowly admitted into chamber 25 until the pressure within said chamber attains a known value. During the admission of air into said chamber the interference fringes produced by monochromatic light, i. e. the luminous discharge of Geissler tube 60, are observed through telescope 58. Monochromatic light produces fringes of the same color and shape regardless of differences in optical lengths of the paths traversed by the divided rays and said fringes move past the reference line at a rate determined by the rate of change of optical length of one of the divided rays in this case by the rate of pressure change.

By counting the fringes as they move past the reference line and knowing the geometric length of the changing air path as well as the wave length of the monochromatic light, the pressure difference equivalent to the movement of a predetermined number of fringes may be determined. This movement of fringes may thereafter be reproduced by introducing fluorite into the path of one of the divided rays and thus the pressure equivalent of a certain displacement of micrometer mechanism 80 may be determined. This may be directly marked off on scales 84 and 85 or the reading of said scales corresponding to this known pressure change may be recorded on a chart, the latter method being preferred where the instrument is to be employed under conditions of varying temperatures.

In operation, chamber 24 is evacuated to a standard vacuum by pump 33 and valve 30 is closed, and thereafter chamber 25 is opened to atmospheric air by the opening of valve 35, the pressure within said last-named chamber thus becoming equal to that of the atmosphere. White light from bulb 47 is admitted into casing 10, divided and recombined and the images produced thereby are viewed through telescope 58. The fringes of white light appear only when the optical paths of the divided rays are substantially equal and the black fringe of said fringes is centrally located only when the optical paths are exactly equal. Thus, micrometer 80 is actuated through knob 91 to pivot frame 64 and vary the amount of fluorite in optical path BD until interference fringes become apparent through telescope 58 and the black fringe thereof is centrally located.

When the optical paths are thus equalized and the temperature has remained substantially equal to that at which the instrument was calibrated, scales 84 and 85 of micrometer mechanism 80 record the pressure differential equal to the change in optical length for which the fluorite has compensated. However, when the instrument is subjected to changing temperatures during use, it becomes necessary to make a temperature correction, since the index of refraction and therefore the optical length actually varies as a function of the density and the latter varies as the pressure and temperature. Accordingly, a reading of the micrometer scales and a temperature reading as recorded by thermometers 99 and 100 are utilized to determine the actual pressure from a chart or table giving the pressure readings corresponding to any combination of micrometer scale and thermometer readings.

In order to make an accurate temperature correction possible from temperature readings of an ordinary mercury thermometer, the temperature effect upon the pressure readings is decreased to a minimum by means embodied within the instrument. The effect of the thermal expansion or contraction upon the length of chamber 25 is offset by having chamber 24 formed in the same bar as said first-named chamber and the length thereof subjected to the same thermal effects. However, since the density of a vacuum is unaffected by temperature, there is no compensating effect produced within chamber 24 for the change in density of the medium in chamber 25 produced by a temperature change. To compensate for this density effect, a portion of the path of ray BD is caused to increase in length with temperature increases, while the portion of path BC which normally equalizes said first-named portion is affected to a lesser extent by the same temperature change. The portion of path BD so affected is the length between surface 49 and the end of chamber 25 which, as heretofore pointed out, is substantially equal to the additional distance BC (Fig. 1) traveled by ray BC before reaching chamber 24. The distance between surface 49 and chamber 25 varies with the thermal expansion of supporting frame 14 whereas the distance between plates 40 and 41 and therefore distance BC depends on the thermal expansion of separators 42. By suitable choice of materials for frame 14 and separator plates 42, for example, a frame of cast iron and separator plates of quartz, a predetermined difference in the linear lengths of said distances and therefore of paths BC and BD may be produced for different temperatures. This difference in geometric length of the paths due to temperature changes substantially compensates for the difference in densities of the mediums in chambers 24 and 25 due to like temperature changes. Although quartz and cast iron have been successfully employed as the materials producing the compensating difference in geometric lengths of the paths, it will now be understood that other materials having suitable coefficients of thermal expansion may be used for frame 14 and separator plates 42.

To insure against uncontrolled and unpredictable thermal expansions and effects because of temperature differences at different points within casing 10, the latter, as heretofore pointed out, is highly insulated. Few heat conducting parts extend within said casing and consequently the temperature in the latter remains uniform and is not subject to rapid changes because of fluctuations in the temperature of the surrounding atmosphere.

The compensation above described is not complete, but makes possible an accurate pressure determination by the instrument when a temperature reading is obtained from an ordinary mercury thermometer. Thus, a table or chart may be drawn up giving accurate pressure or altitude equivalents for the readings directly obtained upon scales 84 and 85 and thermometers 99 and 100. Without said compensation the reading of scales 84 and 85 would vary so greatly with slight temperature changes that it would be practically impossible to equip a commercial unit with a temperature measuring device capable of registering the temperature to the desired accuracy.

There is thus provided a novel barometric pressure and altitude measuring device wherein the density of a medium free to enter a chamber in said device is measured by the interference of a light beam, and said measurement, together with a reading of the temperature within the instrument, is utilized to obtain the pressure or altitude of said medium. When said device is to be employed for laboratory purposes or otherwise used where a substantially constant temperature may be maintained, the reading of the pressure may be directly obtained from a single instrument setting.

Novel indicating and calibrating means are also combined within the instrument whereby the accuracy of the scale settings may be determined and the pressure of the standard medium against which measurements are made may be checked and reproduced. Furthermore, novel temperature compensating means are provided whereby commercially available thermometers are sufficiently accurate for temperature readings.

Although only a single embodiment of the invention has been illustrated and described, it is to be expressly understood that the same is not limited thereto. Various changes may be made in the design and arrangement of parts without departing from the spirit and scope of the invention. For a definition of the invention, reference will be had primarily to the appended claims.

What is claimed is:

1. In an instrument having interferometric means for measuring the difference in pressure between equal geometric lengths of two mediums, a pair of chambers for containing said mediums, to provide the equal geometric lengths thereof for measurement by said means, said chambers being formed in a bar of fixed length having longitudinal parallel openings therethrough and having transparent plates wrung to the parallel ends thereof.

2. In apparatus utilizing the interference of light as a basis for a pressure measurement, means for varying the optical length of a beam of light comprising a pivotally mounted transparent plate interposed in the path of said beam, mechanism adapted to pivot said plate and vary the length of said plate in said path, indicating means including scales calibrated on said mechanism to measure the movement imparted to said plate, actuating means accessible for manual operation, and a collapsible member operatively connecting said actuating means to said mechanism, said member being adapted to transmit a torque applied by said actuating means to said mechanism and to absorb axial forces without transmitting the same to said mechanism.

3. In a device for measuring barometric pressures, a source of light, means for dividing a beam of said light from said source into two beams, and means for varying the optical length of one of said divided beams, said last-named means comprising a transparent plate interposed in the path of said last-named beam, a pivotally mounted supporting frame carrying said plate, a micrometer mechanism engaging said frame, means for actuating said micrometer mechanism to pivot said frame and vary the length of said transparent plate in the path of said last-named beam, and a vibration absorbing means operatively connecting said actuating means to said micrometer mechanism.

4. In a pressure measuring device, interferometric means for measuring the density of an unknown medium including means for dividing a beam of light into two beams of substantially equal intensities, and means for varying the length of the optical path of one of said beams, said last-named means comprising a plate of transparent material having an index of refraction differing from that of air, a frame member supporting said plate in the path of said last-named beam, means for pivotally mounting said member, an element secured to said member, micrometer mechanism adapted to engage said element to pivot said member and vary the length of said plate in the path of said beam, resilient means maintaining the engagement between said mechanism and said element, actuating means, means for limiting the motion of said actuating means in both directions, and vibration absorbing means operatively connecting said micrometer mechanism to said actuating means.

5. In apparatus of the class described, the combination with interferometric means for measuring the pressure difference between two mediums, said means comprising a casing, and a pair of chambers mounted within said casing for containing said mediums, of calibrating apparatus including Geissler tubes mounted on the exterior of said casing, each of said tubes communicating with one of said chambers, and means for applying a high potential across the terminals of said tubes to indicate the degree of vacuum in said chambers.

6. In apparatus utilizing light interference for measuring barometric pressures, a casing, a chamber of known length mounted in said casing and adapted to be evacuated to provide a known length of comparison medium, means for evacuating said chamber, a Geissler tube mounted on the exterior of said casing and communicating with said chamber, and means for applying a high potential across the terminals of said tube to visually indicate the degree of vacuum existing in said chamber.

7. In a measuring instrument utilizing light interference as a basis for measurement, a casing, a member of known length supported within said casing and having parallel end surfaces, said member having a pair of openings therein extending the length thereof, a pair of transparent plates, one of said plates being wrung to each end of said member to form chambers of said openings, the interiors of said chambers being isolated from the interior of said casing, means connecting one of said chambers with the atmosphere, and evacuating means communicating with the other of said chambers.

8. In apparatus utilizing the light interference principle wherein a beam of light is divided into two rays, a casing, pivotal means adapted to vary the optical path of one of said rays, mechanism adapted when actuated to move said pivotal means, said mechanism including indicating means for measuring the motion imparted to said pivotal means, vibration absorbing means secured at one end to said mechanism, said pivotal means, mechanism and vibration absorbing means being mounted within said casing, and actuating means mounted on the exterior of said casing, said actuating means extending within said casing and being secured to the other end of said vibration absorbing means.

9. In a measuring instrument, a casing, a supporting member mounted in said casing, a bar supported by said member and having a pair of openings extending therethrough, a pair of transparent closure plates for said openings secured to the ends of said bar, said plates being parallel to each other whereby chambers of equal length are formed in said bar, interferometric means for measuring the difference in density between the mediums contained in said chambers, said interferometric means comprising means for dividing a beam of light into two rays, means for directing one ray through one of said chambers and the other ray through the other of said chambers, means for recombining said rays and means for directing and viewing the recombined beam, said dividing, directing and recombining means being mounted on the interior of said casing and said viewing means in the wall of said casing, means connecting one of said chambers to the atmosphere, and means communicating with the other of said chambers for providing a medium of known index of refraction therein.

10. In apparatus of the class described, means comprising a pair of closed and substantially parallel chambers having transparent ends, a source of light, means for dividing a beam of light from said source into two substantially parallel rays and for directing one ray into one of said chambers and the other ray into the other of said chambers, reflecting means disposed exteriorly of one of said chambers for reflecting the ray passing therethrough back to the dividing and directing means, compensating means disposed between said last-named chamber and said reflecting means, said compensating means being adapted to vary the optical length of the light path of the ray intercepted thereby, means for reflecting the other ray back to the dividing and directing means, said dividing and directing means being adapted to recombine the reflected rays, viewing means, means for directing the recombined beam into said viewing means, means for providing a medium of known index of refraction in one of said chambers, means for introducing a medium of unknown index into the other chamber, means for actuating said compensating means to equalize the optical lengths of the paths of the divided rays, and means for indicating the amount of movement imparted to said compensating means to accomplish the equalization, said movement being a function of the difference in indices of refraction of said mediums.

11. In interferometric means for measuring the difference in pressure between the mediums in a chamber containing atmospheric air and an evacuated chamber, a source of light, means for dividing a beam of light from said source into two rays and for directing one of said rays through the atmosphere filled chamber, means for directing the other of said rays through the evacuated chamber, reflecting means, said dividing means, directing means and reflecting means causing said rays to be recombined, metallic means for supporting the members determining the path of the ray passing through the atmosphere filled chamber, and means, comprising a metallic portion and a quartz portion, for supporting the members determining the path of the ray passing through the evacuated chamber, said quartz portion having a lesser coefficient of thermal expansion than the metallic means and causing the geometric length of the path of the latter ray to be increased less than the path of the former ray by increases in temperature.

12. In interferometric means for measuring the difference in pressure between the mediums in a chamber containing atmospheric air and an evacuated chamber, a source of light, means for dividing a beam of light from said source into two rays and for directing one of said rays through the atmosphere filled chamber, means for directing the other of said rays through the evacuated chamber, reflecting means, said dividing means, directing means and reflecting means causing said rays to be recombined, metallic means for mounting the members which determine the path of the ray passing through the atmosphere filled chamber, and means for mounting the members determining the path of the ray through the evacuated chamber, said last-named mounting means having a smaller average coefficient of thermal expansion than said first-named mounting means whereby the path of the ray passing through the atmosphere filled chamber is increased in length a greater amount by increases in temperature.

13. In a measuring instrument utilizing light interference as a basis for measuring the difference in pressure between equal lengths of two mediums, means for separately containing said mediums to provide equal lengths thereof as paths for light rays, said means comprising a member provided with parallel end surfaces and having openings therein extending the length thereof, and a pair of transparent plates having parallel faces, one of said plates being wrung to each end of said member to constitute closures for said openings and to form closed chambers of equal length in said member.

14. In apparatus utilizing interferometric means for measuring the pressure difference between two mediums, a chamber of known length adapted to be evacuated to provide a known length of comparison medium, means for evacuating said chamber, a Geissler tube communicating with said chamber, and means for applying a high potential across the terminals of said tube to visually indicate the degree of vacuum existing in said chamber.

15. In a measuring instrument utilizing light interference as a basis for measurement, a member of known length having parallel end surfaces, said member having a pair of openings therein extending the length thereof, a pair of transparent plates, one of said plates being wrung to each end of said member to form chambers of said openings, means connecting one of said chambers with the atmosphere, and means for providing the other of said chambers with a medium of known index of refraction.

ROY T. HURLEY.